US011054272B2

(12) United States Patent
Bejot et al.

(10) Patent No.: US 11,054,272 B2
(45) Date of Patent: Jul. 6, 2021

(54) PHYSICAL NAVIGATION GUIDED VIA STORY-BASED AUGMENTED AND/OR MIXED REALITY EXPERIENCES

(71) Applicant: Disney Enterprises, Inc., Burbank, CA (US)

(72) Inventors: Jason T. Bejot, Los Angeles, CA (US); Edward Drake, Agoura Hills, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 328 days.

(21) Appl. No.: 15/593,258

(22) Filed: May 11, 2017

(65) Prior Publication Data
US 2018/0328751 A1 Nov. 15, 2018

(51) Int. Cl.
*G06T 13/00* (2011.01)
*G01C 21/36* (2006.01)
(Continued)

(52) U.S. Cl.
CPC ........... *G01C 21/365* (2013.01); *G01C 21/20* (2013.01); *G01C 21/362* (2013.01);
(Continued)

(58) Field of Classification Search
CPC ................ G01C 21/20; G01C 21/3608; G01C 21/3617; G01C 21/362; G01C 21/3626;
(Continued)

(56) References Cited

U.S. PATENT DOCUMENTS 7,460,953 B2     12/2008   Herbst et al.
7,741,978 B2 *   6/2010   Becker .................. H04W 4/029
                                                                      340/995.24
(Continued)

FOREIGN PATENT DOCUMENTS

JP    H09102098 A    4/1997
JP    2008026653 A    2/2008

OTHER PUBLICATIONS

The Influence of Visual Appearance of User's Avatar on the Manipulation of Objects in Virtual Environments; Abdelmajid Kadri; Anatole Lecuyer;Jean-Marie Burkhardt;Simon Richir;2007 IEEE Virtual Reality Conference; IEEE Conference Paper. (Year: 2007).*
(Continued)

*Primary Examiner* — Cuong H Nguyen
(74) *Attorney, Agent, or Firm* — Dorsey & Whitney, LLP

(57) ABSTRACT

Systems and methods for providing physical navigation guidance via augmented reality (AR) environments are provided. An AR experience is generated based on navigation information including a starting location and a destination location. The AR experience comprises physical navigation guidance from the starting location to the destination location using virtual elements that are associated with either or both the starting location and/or the destination location. For example, virtual elements in the AR environment can transition from virtual elements associated with the starting location to virtual elements associated with the destination location as the user progresses from the starting location to the destination location.

17 Claims, 7 Drawing Sheets

(51) Int. Cl.
*G01C 21/20* (2006.01)
*G06T 13/40* (2011.01)
*G06T 11/60* (2006.01)
*G06T 13/80* (2011.01)

(52) U.S. Cl.
CPC ..... *G01C 21/3608* (2013.01); *G01C 21/3617* (2013.01); *G01C 21/3626* (2013.01); *G01C 21/3661* (2013.01); *G06T 11/60* (2013.01); *G06T 13/40* (2013.01); *G06T 13/80* (2013.01); *A63F 2300/6661* (2013.01)

(58) Field of Classification Search
CPC ... G01C 21/365; G01C 21/3661; G06T 11/60; G06T 13/80; G06T 13/00; G06T 13/40; G06T 13/20; G06T 13/205; H04L 67/18
USPC .......................... 701/427; 345/633, 473, 2.2
See application file for complete search history.

(56) References Cited

U.S. PATENT DOCUMENTS

| | | | |
|---|---|---|---|
| 8,555,164 B2* | 10/2013 | Huang | G06T 13/40 715/706 |
| 9,159,152 B1* | 10/2015 | Glover | A63F 13/42 |
| 9,247,236 B2* | 1/2016 | Bell | G06F 3/0304 |
| 9,286,711 B2 | 3/2016 | Geisner et al. | |
| 9,311,742 B1* | 4/2016 | Glover | G06T 19/003 |
| 9,338,622 B2 | 5/2016 | Bjontegard | |
| 9,396,618 B2 | 7/2016 | Weston et al. | |
| 9,690,373 B2 | 6/2017 | Haseltine | |
| 10,096,143 B2* | 10/2018 | Nam | G06T 13/80 |
| 10,169,897 B1* | 1/2019 | Geiger | G06F 3/0482 |
| 10,181,213 B2* | 1/2019 | Bullivant | G06N 3/004 |
| 10,275,121 B1* | 4/2019 | Geiger | H04L 29/06176 |
| 10,373,342 B1* | 8/2019 | Perez, III | G06T 7/97 |
| 10,503,351 B2* | 12/2019 | Gullicksen | G06F 3/0346 |
| 10,553,036 B1* | 2/2020 | Perez, III | G02B 27/017 |
| 10,594,786 B1* | 3/2020 | Perez, III | G06F 3/0346 |
| 10,672,288 B2* | 6/2020 | Ribeira | G16H 50/50 |
| 10,732,797 B1* | 8/2020 | Perez, III | G06F 3/04815 |
| 10,831,278 B2* | 11/2020 | Bell | G06T 13/40 |
| 2006/0129637 A1 | 6/2006 | Yoshida | |
| 2009/0058683 A1* | 3/2009 | Becker | G01C 21/20 340/989 |
| 2010/0060722 A1* | 3/2010 | Bell | H04N 13/254 348/51 |
| 2012/0244945 A1* | 9/2012 | Kolo | A63F 13/58 463/42 |
| 2012/0317511 A1* | 12/2012 | Bell | G06T 13/40 715/782 |
| 2014/0229287 A1 | 8/2014 | Ben-David et al. | |
| 2014/0347368 A1* | 11/2014 | Kishore | G06T 13/00 345/473 |
| 2015/0212647 A1* | 7/2015 | Kim | G06F 1/1643 345/173 |
| 2016/0093106 A1* | 3/2016 | Black | G06K 9/00214 345/633 |
| 2016/0104452 A1 | 4/2016 | Guan et al. | |
| 2016/0125635 A1* | 5/2016 | Nam | A63F 13/65 715/781 |
| 2016/0129637 A1 | 5/2016 | Zhou et al. | |
| 2016/0142830 A1* | 5/2016 | Hu | G10L 21/14 434/185 |
| 2016/0191893 A1 | 6/2016 | Gewickey et al. | |
| 2016/0225187 A1 | 8/2016 | Knipp et al. | |
| 2016/0231821 A1* | 8/2016 | Bell | A63F 13/00 |
| 2017/0080346 A1* | 3/2017 | Abbas | A63F 13/79 |
| 2017/0115129 A1 | 4/2017 | Lee et al. | |
| 2019/0243598 A1* | 8/2019 | Kim | G06F 1/1616 |

OTHER PUBLICATIONS

Avatar Selection for Live Performance in Virtual Reality: A Case Study; David Gochfeld;Kiira Benzing;Kevin Laibson;Alex Coulombe; 2019 IEEE Games, Entertainment, Media Conference (GEM); IEEE Conference Paper. (Year: 2019).*
Avatars for Co-located Collaborations in HMD-based Virtual Environments; Jens Herder;Nico Brettschneider;Jeroen de Mooij; Bektur Ryskeldiev; 2019 IEEE Conference on Virtual Reality and 3D User Interfaces (VR); Year: 2019; IEEE Conference Paper. (Year: 2019).*
Teleimmersive 3D collaborative environment for cyberarchaeology; Gregorij Kurillo;Maurizio Forte;Ruzena Bajcsy; 2010 IEEE Computer Society Conference on Computer Vision and Pattern Recognition-Workshops; Year: 2010, IEEE Conference Paper. (Year: 2010).*
Vlahakis et al., Design and Application of an Augmented Reality System for continuous, context-sensitive guided tours of indoor and outdoor cultural sites and museums, retrieved from http://lifeplus.miralab.unige.ch/html/papers/LIFEPLUS-VAST2003-revised.pdf, Dec. 31, 2017, pp. 1-9.
Cavazza et al., Madame Bovary on the Holodeck: Immersive Interactive Storytelling, Proceedings of the 15th international conference on Multimedia, 2007, Sep. 24-29, New York: ACM, pp. 651-660.
Partial European Search Report in European Patent Application No. 18170005.5, dated Sep. 13, 2018.
European Search Report in EP Patent Application No. 18170005.5, dated Dec. 18, 2018.

* cited by examiner

PHYSICAL NAVIGATION GUIDED VIA STORY-BASED AUGMENTED AND/OR MIXED REALITY EXPERIENCES

TECHNICAL FIELD

The present disclosure relates generally to augmented reality (AR) and/or mixed reality (MR) presentations.

DESCRIPTION OF THE RELATED ART

VR can refer to the creation of a fully immersive virtual world/space experience that users may interact with. AR and/or MR can refer to the blending of VR elements and real life. For example, AR and/or MR may involve providing a live displayed experience of a physical, real-world environment in which the real-world elements are augmented by digital, computer-generated sensory input.

BRIEF SUMMARY OF THE DISCLOSURE

In accordance with one embodiment of the present disclosure, a computer-implemented method comprises receiving navigation information for a user trip from a starting location to a destination location. The computer-implemented method further comprises identifying a simulated audio-visual (A/V) experience based on the navigation information. Further still, the computer-implemented method comprises presenting the simulated A/N experience to the user.

In accordance with another embodiment, an apparatus, comprises a simulation device adapted to create a simulated augmented reality (AR) story-telling experience to provide physical navigation guidance for a user from a starting location to a destination location. At least one sensor of the apparatus is adapted to at least one of at least one of receive or provide user location information associated with the user moving from the starting location to the destination location. The apparatus further comprises a presentation device adapted to adapted to present an AR environment in which the AR story-telling experience is synchronized with the user location information.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Navigating from one location to another can be a tedious, and even frustrating activity. An immersive entertainment experience provided during times that people are forced to navigate from one location to another, such as a morning commute, a long road-trip, or moving from one area of an amusement park to another, etc., may help to alleviate the tedious and frustrating nature of physical navigation. Furthermore, an immersive entertainment experience during navigation can also help to prepare a user for his or her destination, or to extend an enjoyable experience. As augmented and mixed reality technologies become more pervasive, these technologies can be leveraged to create more entertaining story-telling experiences.

Accordingly, various embodiments described herein leverage AR or MR technologies to create an immersive story-telling environment in the context of physical guided navigation from one location to another. When a user utilizes a computing device to receive navigation instructions from one location to another, the navigation instructions can be provided to the user within an AR and/or MR experience. Elements of the user experience can be customized based, at least in part, on a user's starting location, a user's destination location, or both. In this way, any navigation experience can be turned into an interactive narrative experience.

For example, a user's navigation device (e.g., a mobile phone or tablet device) can exchange navigation information with an AR or MR creation system to generate one or more digital elements that are experienced by a user as the user navigates from a starting location to a destination location. Such digital elements can include visual elements and/or audio elements that supplement a user's visual or audio sensory inputs from the physical, real world. The digital elements presented in an AR/MR environment can be selected based on various pieces of contextual information, including, for example, a user's starting location and the user's intended destination location. It should be noted that the terms augmented reality (or "AR") and mixed reality (or "MR"), while arguably different in scope, will be used interchangeably within the present disclosure. Both AR and MR, as used herein, can be understood to refer to the blending of digital, virtual elements and real, physical objects or environments.

Figure 1:
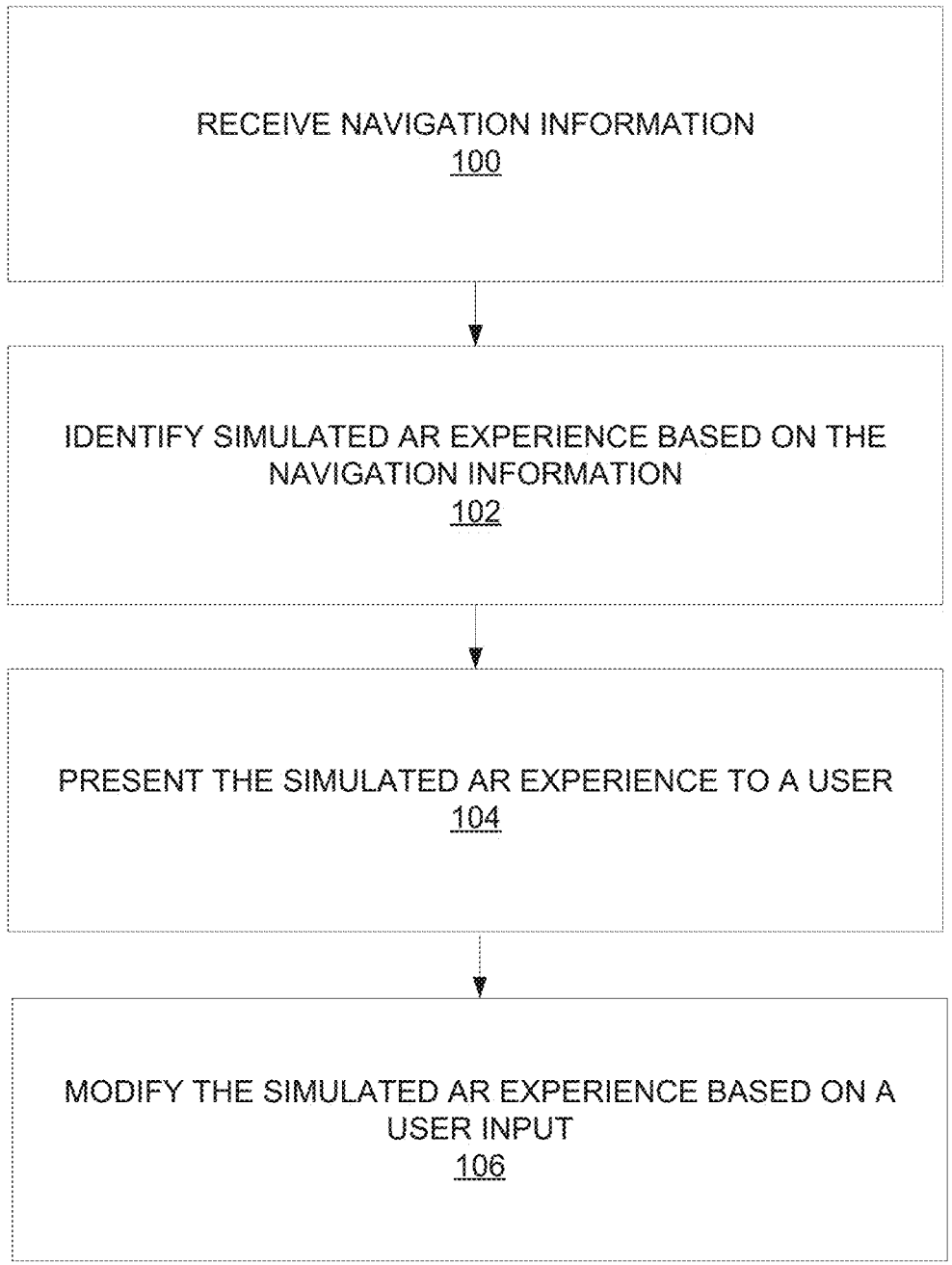
FIG. 1 is an operational flow diagram illustrating an example process for providing physical navigation guidance via a simulated AR experience, in accordance with various embodiments.
Figure 2:
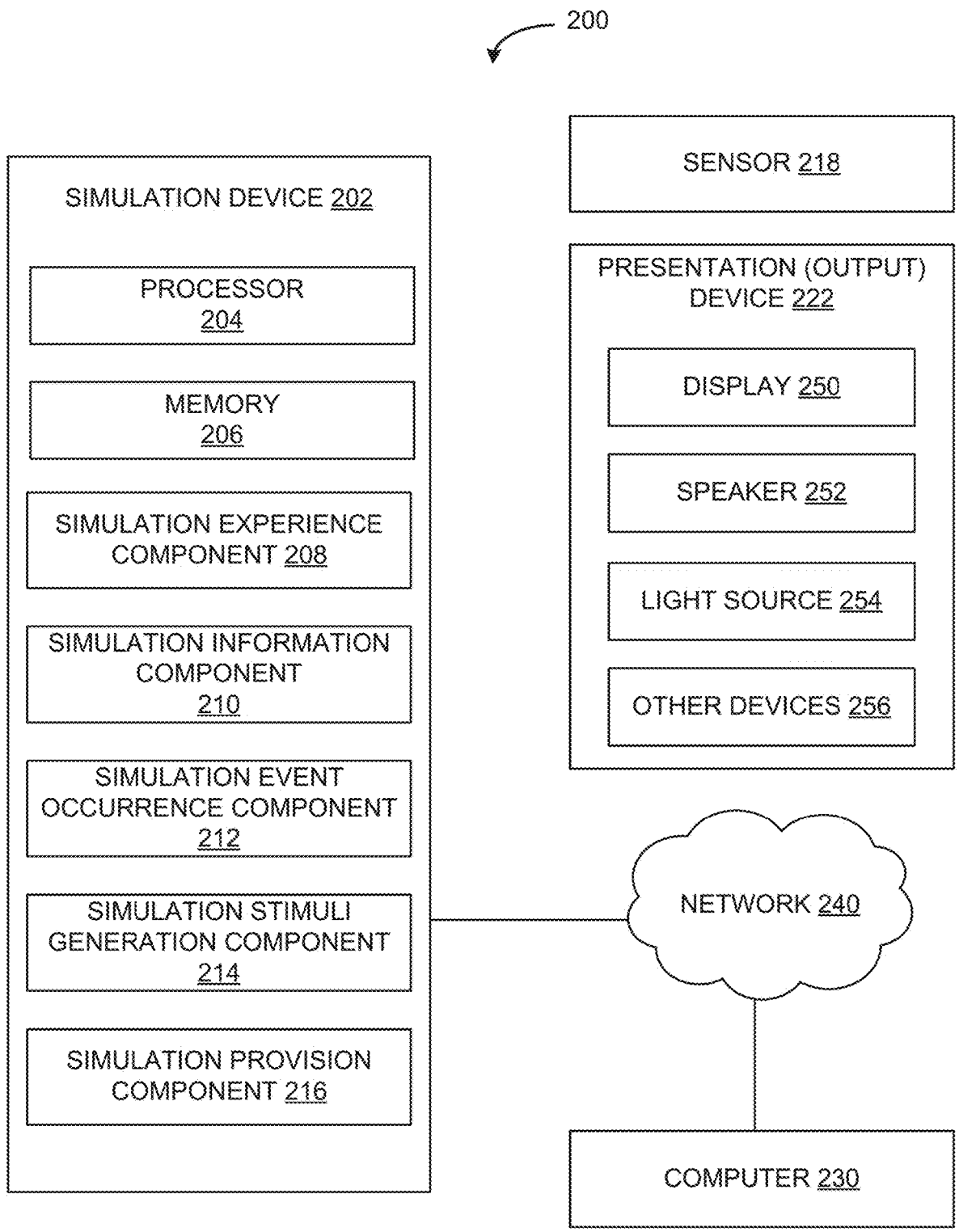
FIG. 2 illustrates an example AR experience system in accordance with various embodiments.

FIG. 1 is a flow chart illustrating various operations performed in accordance with various embodiments for providing physical navigation guidance via a simulated AR experience. FIG. 1 will be described in conjunction with FIG. 2, which is an example representation of an AR system or device 300 through which an AR experience can be implemented.

At operation 100, navigation information is received. Navigation information can include a starting location and a destination location for a user. For example, a user wishing to go from one area of an amusement park to another can identify a starting location within the amusement park and a desired destination location within the amusement park so as to receive navigation guidance to the desired destination location. Navigation information can be received in a variety of ways. For example, in one embodiment, navigation information can be manually entered by a user. In another embodiment, navigation information can be determined based on a user's current location. For example, a user's current location can be determined using GPS information or other location information and used as a starting location. In other embodiments, navigation information may be determined from other contextual information. For example, a user's destination can be inferred based on an electronic calendar entry that lists a location. When a current time approaches a time associated with the electronic calendar entry, it can be inferred that a user is going to the location associated with the electronic calendar entry. In yet another example, a user's destination can be inferred based on user history or routine. For example, if a user goes to a park to eat lunch every day, it can be inferred at lunch time on any given day that the user is going to the park. In yet another example, a user's destination can be inferred based on auditory signals given by a user. For example, the statement "Let's go ride Theme Park Ride A!" can be used to infer that the user's destination is Theme Park Ride A.

At operation 102, a simulated audio/visual (A/V) experience is identified based on the navigation information. A simulated A/V experience may refer to a simulated presentation conveyed to a user through various media. Such media may include one or more of visual, audio, haptic, and/or other media, where the visual, audio, haptic, and/or other media changes based on navigation information received, as will be described in greater detail below. A simulated presentation may include the presentation of simulation content. The simulation content may include one or more of a character or guide, a story, an image, a video, a movie, an audio track, a song, and/or other content. For example, a simulated experience may include an animated guide directing a user from a starting location to a destination location.

At operation 104, the simulated A/V experience is presented to a user. Presentation of a simulated A/V experience can be understood to include presentation of an AR environment. Presentation and identification of the simulated A/V experience (e.g., operations 102 and 104 of FIG. 1) can be accomplished by an AR system 200, such as that illustrated in FIG. 2. System 200 may include one or more of a simulation device 202, a sensor 218, and a presentation (output) device 222. Some or all components of system 200 may be worn or held by a person. Some or all components of system 200 may be installed in a device worn by a person and/or otherwise coupled with a device worn by a person.

Presentation (output) device 222 may be configured to provide a simulation experience visually, audibly, haptically, and/or in other ways. Presentation device 222 may include one or more of a display, a speaker, a light source, and/or other simulation devices.

A display may provide a simulation experience through visual information presented on the display. Visual information may include information that may be observed visually, such as an image, video, and/or other visual information. In one embodiment, a display may include one or more of an optical head-mounted display, a head-mounted display 104 in which simulation device 302 (or alternatively, presentation device 322) may be integrated, a see-through display, an optical see-through display, a video see-through display, a visor, eyeglasses, sunglasses, a computer, a laptop, a smartphone, a tablet, a mobile device, a projector, and/or other displays.

In some implementations, a display may include a motion, position, and/or orientation tracking component, so that the visual information presented on the display changes as the position and/or orientation of the display changes. For example, as a user moves his or her mobile device to capture different areas of the user's physical environment, the display on the mobile device can change according to what is being captured by a camera of the mobile device. In another example, if a user is wearing AR eyeglasses that allows the user to view digital AR elements through the eyeglasses, the digital AR elements being displayed can change as the user changes his or her physical position or as the user moves his or her head to change views.

A display may be configured to display a simulation experience using AR technology. For example, a display may visually provide the simulation experience by displaying an overlay image over one or more of an image, a video, and/or other visual information so that one or more parts of real-world objects appear to be augmented by one or more parts of virtual-world objects. Other systems and methods of providing a simulation experience are contemplated.

A speaker may provide a simulation experience through audio information generated by the speaker. Audio information may include information that may be observed audibly. Audio information may include one or more of sound, vibration and/or other audio information. A speaker may include one or more of a headphone, an earphone, a headset, an earset, and/or other speakers. In some implementations, a speaker may include a speaker associated with a display. For example, a speaker may include a speaker of a mobile device, such as a smartphone.

A light source may provide a simulation experience through one or more wavelengths and/or intensities of light. A light source may include an electric lighting, a fluorescent lighting, an incandescent lighting, an infrared lighting, a light-emitting diode, and/or other light sources. In some implementations, a light source may include a light source of a mobile device, such as a smartphone.

In order to identify and present a simulated A/V experience based on navigation information (operations 102 and 104 of FIG. 1), simulation device 202 may be configured to execute one or more computer program components. The computer program components may include one or more of a simulation experience component 208, a simulation information component 210, a simulation event occurrence component 212, a simulation stimuli generation component 214, a simulation provision component 216, and/or other components.

Simulation experience component 208 may be configured to select a simulated A/V experience or overall theme based on navigation information. It should be noted that a simulated A/V experience may also be selected based upon a user selection, a prior simulated A/V experience, and/or other information. Simulation experience component 308 may include or retrieve information (for example, from a database) that matches one or more of navigation information, a user selection, a prior simulated A/V experience, and/or other information relating to a particular simulation experience.

In some implementations, navigation information can include a starting location and a destination location. The simulation experience component 208 may select a simulated A/V experience based on one or both of the starting location and the destination location. For example, a simulated A/V experience can be selected based on both the starting location and the destination location, such that the simulated A/V experience transitions from a simulated A/V experience associated with the starting location to a simulated A/V experience associated with the destination location. An example of such a simulated A/V experience might include a virtual guide that provides navigation guidance from the starting location to the destination location. The guide can initially be presented as a character associated with a user's starting location, and can gradually transition into another character associated with the user's destination location as the user navigates toward the destination location. In various embodiments, presentation of the simulated A/V experience can be synchronized with the user's location.

In some implementations, a simulated A/V experience can be selected based on the destination location, such that the simulated A/V experience provides navigation instructions to a user while presenting simulated elements relating to or associated with the destination location. For example, if a user is going from his or her home to a movie theater to watch a movie, various virtual elements relating to the movie can be presented as the user navigates to the movie theater.

In some implementations, a simulated A/V experience can be selected based on the starting location, such that the simulated A/V experience provides navigation instructions to a user while presenting simulated elements relating to or associated with the starting location. For example, for a user that has just finished watching a movie and is returning home, the user can be presented with a simulated A/V experience relating to the movie as the user is provided with navigation guidance home.

In some implementations, a determination can be made as to whether a simulated A/V experience should be selected based on the starting location or based on the destination location. For example, a user that is receiving navigation guidance to a vacation may wish to view a simulated A/V experience that is associated with the destination location so that the user can enjoy a simulated A/V experience that allows the user to look forward to his or her vacation destination. However, when that same user is navigating back home from vacation, the user may not wish to view a simulated A/V experience associated with home, but, rather, may prefer to view a simulated A/V experience associated with the vacation location. This may be the case, for example, so that the user can enjoy his or her vacation a little while longer. As such, in the second scenario, the simulated A/V experience may be selected based on the starting location rather than the destination location.

In order to determine whether a simulated A/V experience should be selected based on a starting location or based on a destination location, a weighting or ranking of locations may be maintained. The weights or rankings of locations can be indicative of a user's preference with respect to various locations. For example, a vacation location may be ranked more highly or be weighted more greatly than a home location, and a home location may be ranked more highly or weighted more greatly than a work location. In certain embodiments, a user can provide his or her preferences as to which locations he or she prefers over others.

In some implementations, simulation experience component 208 may select a simulated A/V experience based on other characteristics in addition to navigation information. For example, a simulated A/V experience may be selected based on other contextual information. Examples of other contextual information can include weather (e.g., a sunny day may yield a different simulated A/V experience from a rainy day), time of day (e.g., daytime v. nighttime), personal/user preferences (e.g., a user may be presented with one character guide over another based on personal preferences), personal user metadata (e.g., social media connections, recently visited locations, recent online purchases, native language, etc.), personal/biological data (e.g., age, height, etc.), and the like.

In some implementations, a simulated A/V experience can include a particular navigation path. For example, if contextual information indicates that it is raining, the simulated A/V experience may guide a user along a path that takes the user under more eaves, umbrellas, or overhangs to avoid the rain. In another example, if contextual information indicates that it is nighttime, and certain areas of a park are closed, a simulated A/V experience can be selected such that the user is provided with navigation guidance that only takes the user to areas of the park that are still open.

Simulation Information component 210 may be configured to obtain simulation information for the simulated A/V experience. Simulation information may include one or more of a database, a lookup table, and/or other information component that allows simulation information component 210 to match a simulation event to a simulation stimulus. A simulation event may refer to one or more of specific motions, specific actions, specific sounds, specific locations, specific surroundings, and/or other specific conditions relating to a user utilizing simulation device 202. A simulation stimulus may refer to one or more of a visual, an audio, a haptic and/or other simulation that may change a simulated A/V experience. The simulation information may be programmed into simulation information component 210, updated by simulation information component 210, obtained by simulation information component 210 from electronic storage, obtained by simulation information component 210 from a remote location, and/or obtained by simulation information component 210 in other ways.

Simulation information may include simulation stimuli that correspond to simulation events. The simulation stimuli may include a first simulation stimulus that corresponds to a first simulation event. For example, a change in user location from one point on a navigation path to another point on the navigation path may represent a simulation event. A simulation stimulus that is associated with the simulation event may be a change in a virtual guide avatar from one form to another, or a change in the types of digital/virtual elements that are displayed along a user's navigation path. Other simulation stimulus and simulation events are contemplated.

Simulation information component 210 may also be configured to obtain contextual information from the user's surroundings, for example, from output signals generated by sensor 218. In one embodiment, simulation information component 210 can obtain contextual information such as physical objects in the vicinity of the user which may be used as a virtual platform on or in which to present digital/virtual elements. In another embodiment, simulation information component 310 can determine a location of the user, and based upon the location, can present customized digital or virtual elements. For example, as a user gets closer to his or her destination location, more digital elements pertaining to the destination location may begin to pop up around the user. In another example, when a user begins his or her journey from a starting location to a destination location, a virtual guide may take a form associated with the starting location. As the user gets closer to the destination location, the virtual guide may change form gradually, and when the user gets within a threshold distance from the destination location, the virtual guide may change to another form associated with the destination location.

Sensor 218 may include one or more of image sensors, temperature sensors, speed sensors, motion sensors, accelerometers, tilt sensors, inclination sensors, angular rate sensors, gyroscopes, navigation sensors, geolocation sensors, magnetometers, radar detectors, radar sensors, proximity sensors, distance sensors, vibration sensors, light detection sensors, vehicle sensors, and/or other sensors. In some implementations, sensor 218 may be worn by a person. In some implementations, sensor 218 may be installed in or otherwise coupled to simulation device 202.

Simulation device 202 may obtain activity information from output signals generated by sensor 218. In some implementations, sensor 218 may include one or more of an image sensor that characterizes an action performed by a user, a sound sensor that characterizes a sound made by a user, a wearable sensor that characterizes an action performed and/or a sound made by a user, and/or other sensors.

Simulation information component 210 can also be configured to receive simulation information from additional sources. For example, simulation information component 210 can receive weather information from an online weather source, or time of day information from an online time source.

Simulation event occurrence component 212 may be configured to identify occurrences of simulation events. A simulation event may refer to one or more specific motions, specific actions, specific sounds, specific locations, specific surroundings, and/or other specific conditions relating to a user. Occurrences of simulation events may be identified based on one or more of motion information, activity information, environment information, etc. Simulation event occurrence component 212 may be configured to identify an occurrence of a simulation event when one or more of motion information, activity information, etc. indicates the occurrence of one or more specific motions, specific actions, specific sounds, specific locations, specific surroundings, and/or other specific conditions relating to the user that correspond to a specific simulation event.

Criteria for an occurrence of one or more simulation events may be referred to as a simulation event logic. The simulation event logic may be programmed into simulation event occurrence component 212, updated by simulation event occurrence component 212, obtained by simulation event occurrence component 212 from the simulation information, obtained by simulation event occurrence component 212 from memory, obtained by simulation event occurrence component 212 from a remote location, and/or obtained by simulation event occurrence component 212 in other ways.

Simulation stimulation generation component 214 may be configured to generate simulation stimuli that correspond to simulation events for which occurrences are identified. A simulation stimulus may refer to one or more of a visual, an audio, a haptic and/or other simulation that may change a simulated A/V experience. Simulation stimulation generation component 214 may be configured to generate a simulation stimulus for a simulation event when the simulation stimulus corresponding to the simulation event is found in the simulation information.

Simulation provision component 216 may be configured to effectuate provision of a simulated A/V experience by operating simulation device presentation (output) device 222. Presentation (output) device 222 may include one or more of a display, a speaker, a light source, an air conditioner, a heater, a temperature controller and/or other simulation devices, some of which were described in greater detail above. Simulation provision component 216 may be configured to effectuate provision of a simulated A/V experience through one or more visual, audio, haptic and/or other simulation, where the visual, audio, haptic, and/or other simulation changes based on simulation stimuli.

Figure 3A:
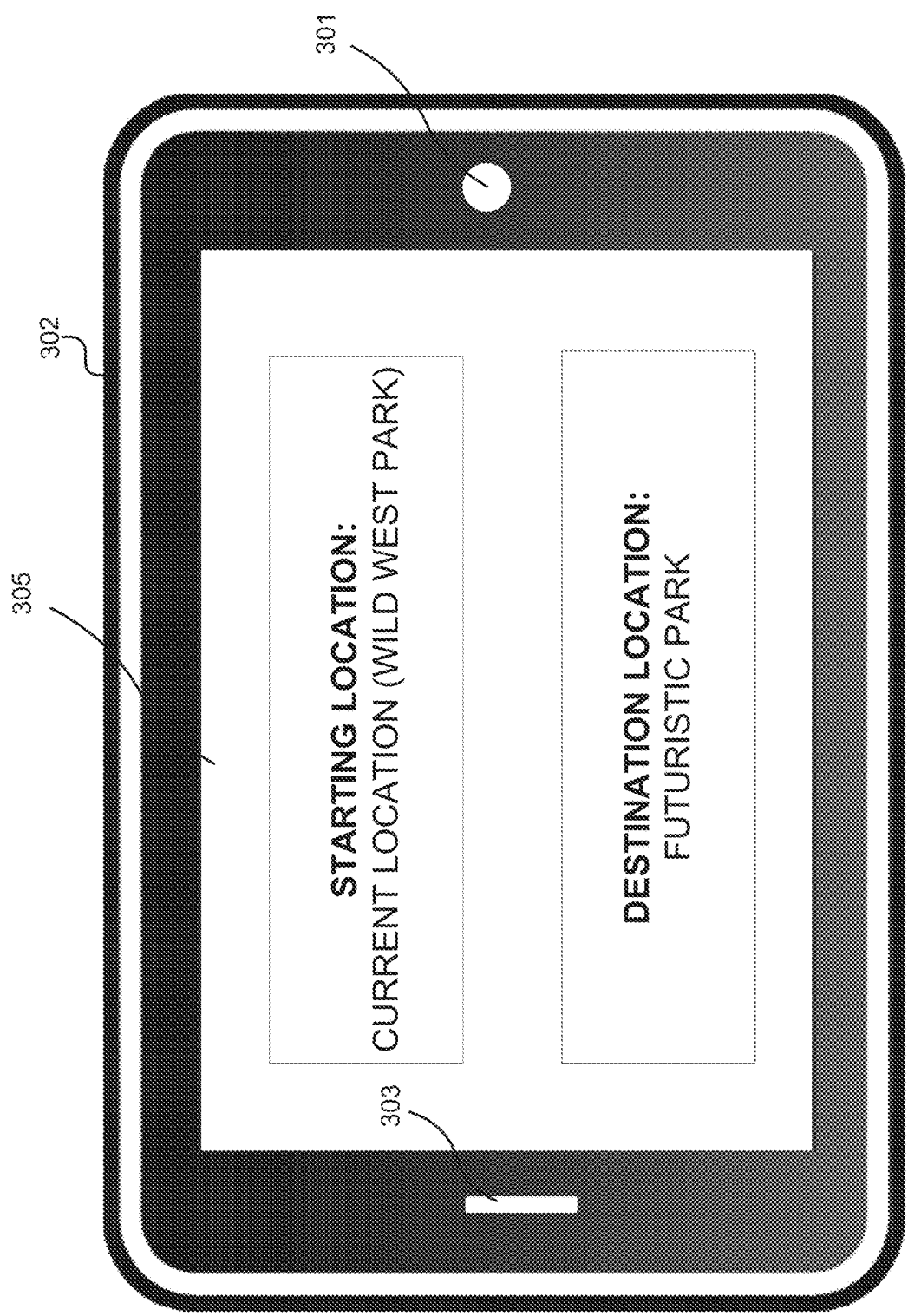
FIGS. 3A, 3B, 3C, and 3D illustrate an example physical navigation guided AR scenario, in accordance with one embodiment.
Figure 3B:
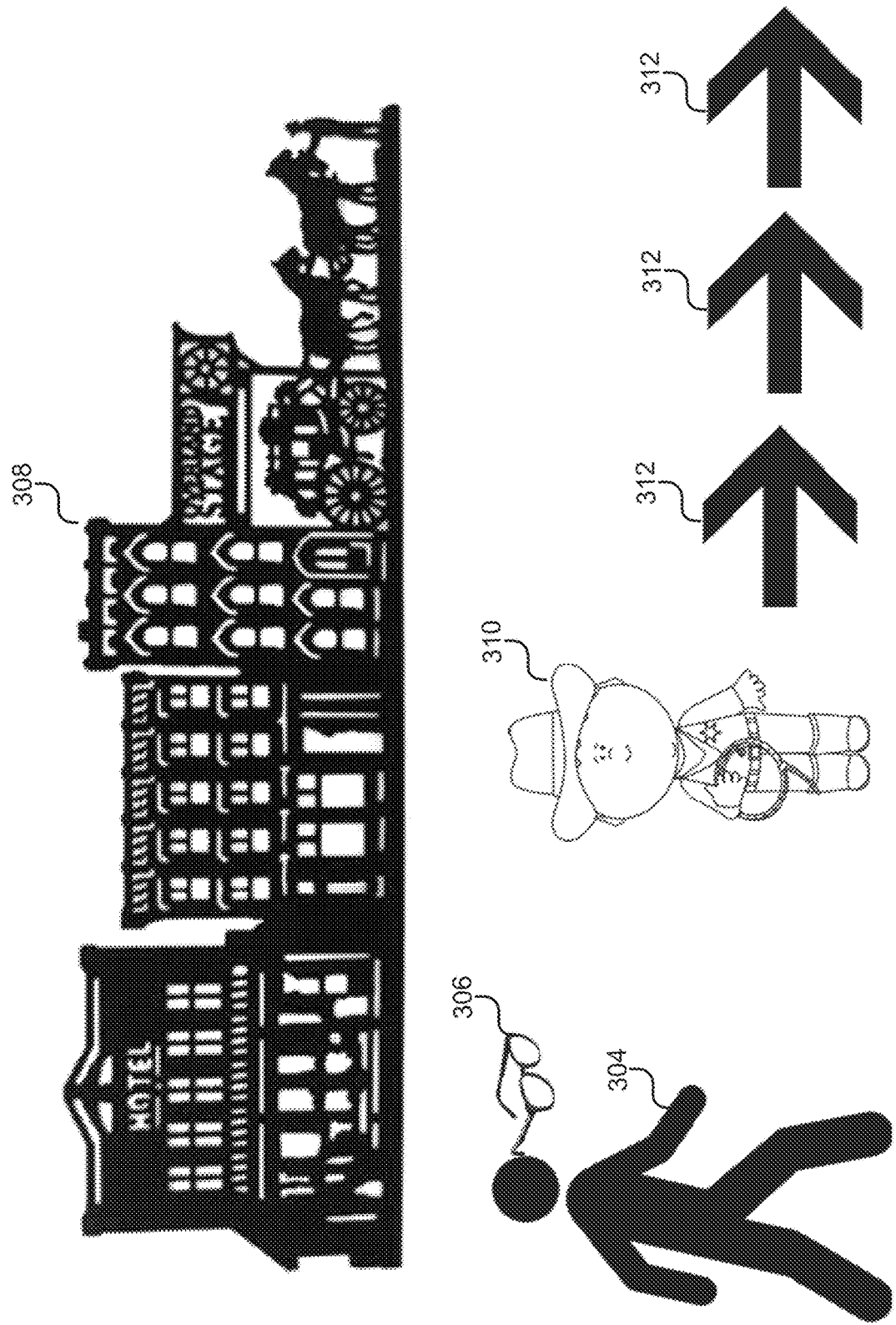

As alluded to above, a simulated AR experience may refer to a simulated A/V experience comprising one or more digital elements blended with real world elements. A simulated AR experience can be used to provide physical navigation guidance to a user via one or more virtual elements presented to the user. FIGS. 3A-D depict an example scenario associated with providing physical navigation guidance via a simulated AR experience. In FIG. 3A, a user has specified on a mobile device 302 that he or she wishes to receive navigation guidance from a starting location (in this example, an area of a theme park known as Wild West Park) to a destination location (an area of the theme park known as Futuristic Park). In FIG. 3B, the user 304 is wearing a headset 306 and is located at the starting location, Wild West Park 308. The user 304 can view a digital AR representation of a cowboy 310 to guide the user from the starting location to the destination location. Digital AR arrows 312, also visible via the headset 306, also provide navigational guidance for the user from Wild West Park to Futuristic Park.

To achieve this experience, simulation experience component 208 may determine, based upon navigation information, e.g., the starting location and/or destination location (obtained from simulation information component 210 and/or sensor 218), that cowboy 310 is to be presented to the user 304 as the user's guide. The cowboy 310 was selected based on its association with the user's starting location, Wild West Park. The user can follow the cowboy 310 and the digital arrows 312 to move towards the user's desired destination location.

Figure 3C:
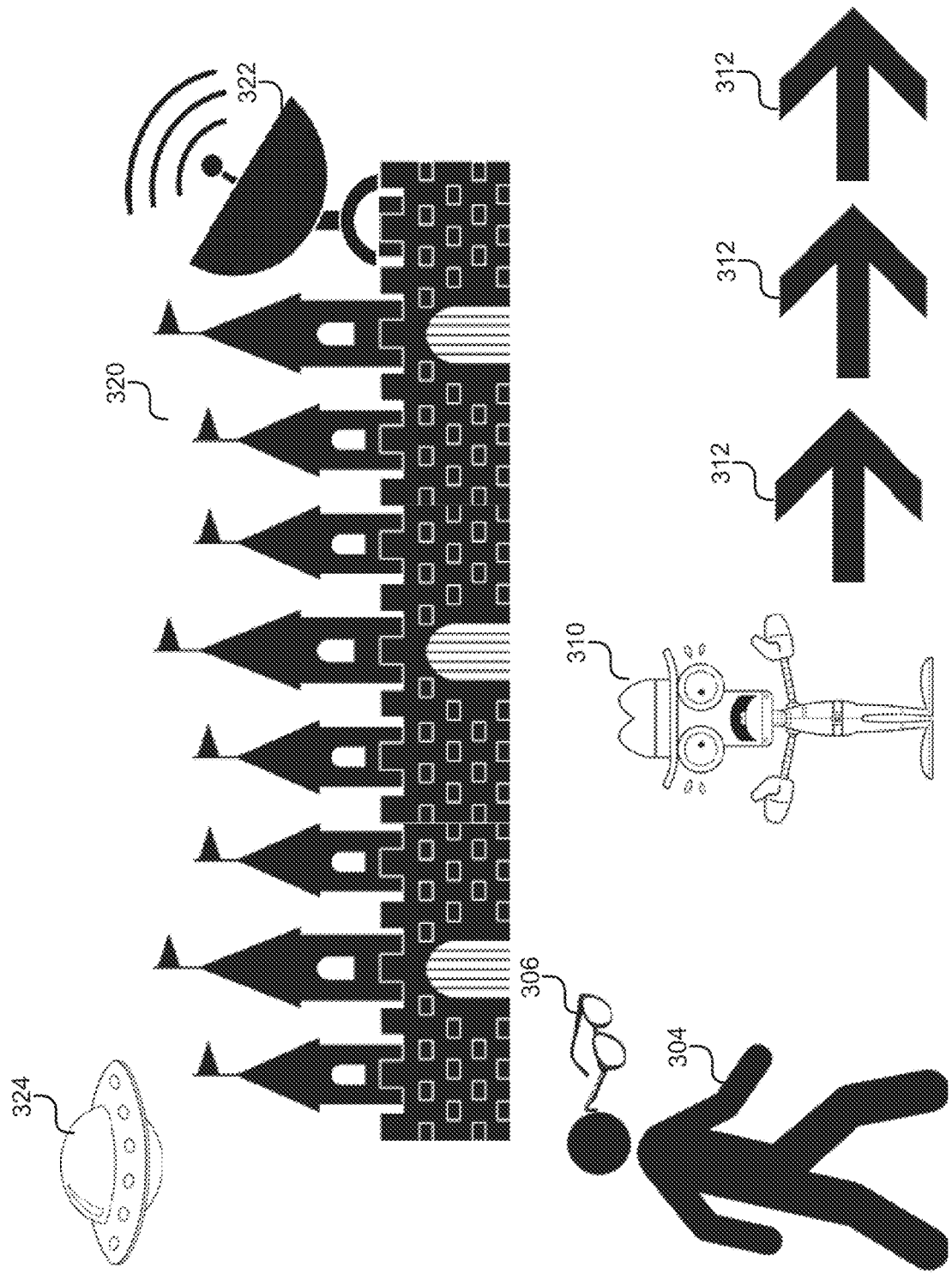

In FIG. 3C, the user 304 has moved from Wild West Park 308 to Medieval Park 320, which is on the user 304's route to Futuristic Park. Simulation event occurrence component 212 can sense that the user's location has changed, and that the user has moved closer to the destination location. Simulation event occurrence component 212 can interact with simulation stimuli generation component 214 to modify the simulated A/V experience in accordance with the simulation event. In this example scenario, the guide 310 has changed from a cowboy into a robot cowboy. The robot cowboy represents a guide that is associated partially with the starting location (Wild West Park) and associated partially with the destination location (Futuristic Park).

Additionally, simulation information component 210 may determine that there are physical environmental structures upon which additional digital elements can be imposed, e.g., the castles of Medieval Park 320. The simulation provision component 216 can present additional virtual/digital elements that relate to the destination location, such as a satellite 322 and a spaceship 324.

Figure 3D:
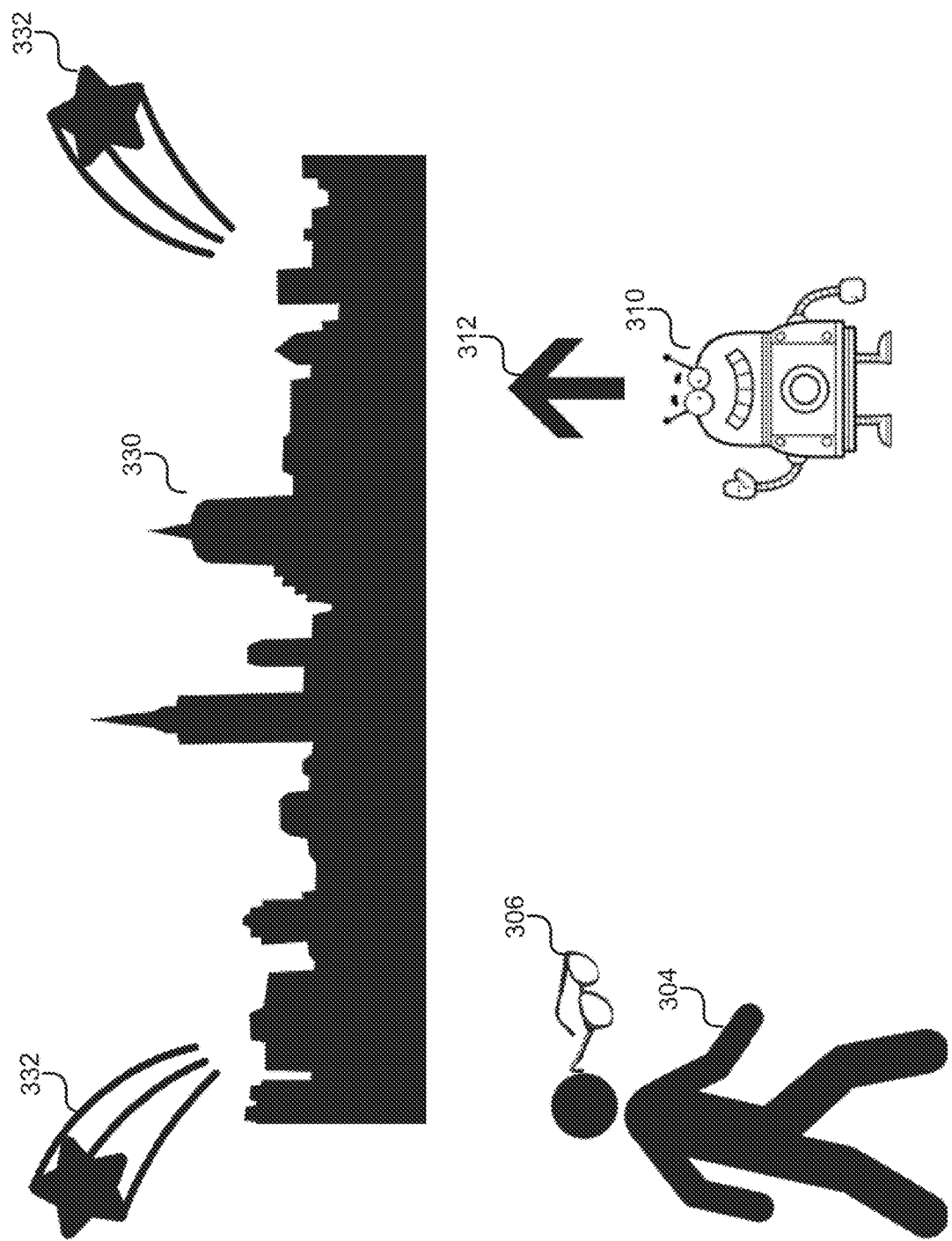

In FIG. 3D, the user 304 has arrived at Futuristic Park 330. Again, the simulation event occurrence component 212 detects the change in user location, and interacts with the simulation stimuli generation component 214 to modify the digital guide 310 from a robot cowboy to a full-fledged robot. The simulation provision component 216 can also present digital shooting stars 332 to indicate that the user has arrived at his or her destination. In this example scenario, it can be seen that a user has been provided with physical navigation guidance from one physical location to another via an AR experience.

In certain embodiments, physical navigation guidance can be provided as continuous guidance. In such embodiments, a user is continuously provided with guidance from Point A to Point B. In the example scenario shown in FIGS. 3A-D, the guide 310 can walk continuously with the user from Wild West Park to Futuristic Park.

In other embodiments, physical navigation guidance can be provided via waypoint-based guidance. In such embodiments, rather than being provided with continuous guidance, users may be provided with guidance from one waypoint to the next. For example, when the user is within a geo-fenced waypoint near Wild West Park, the user can be provided with general directions towards Medieval Park. Then, once the user has arrived within a geo-fenced waypoint near or within Medieval Park, the user can be provided with general directions toward Futuristic Park, etc.

Figure 4:
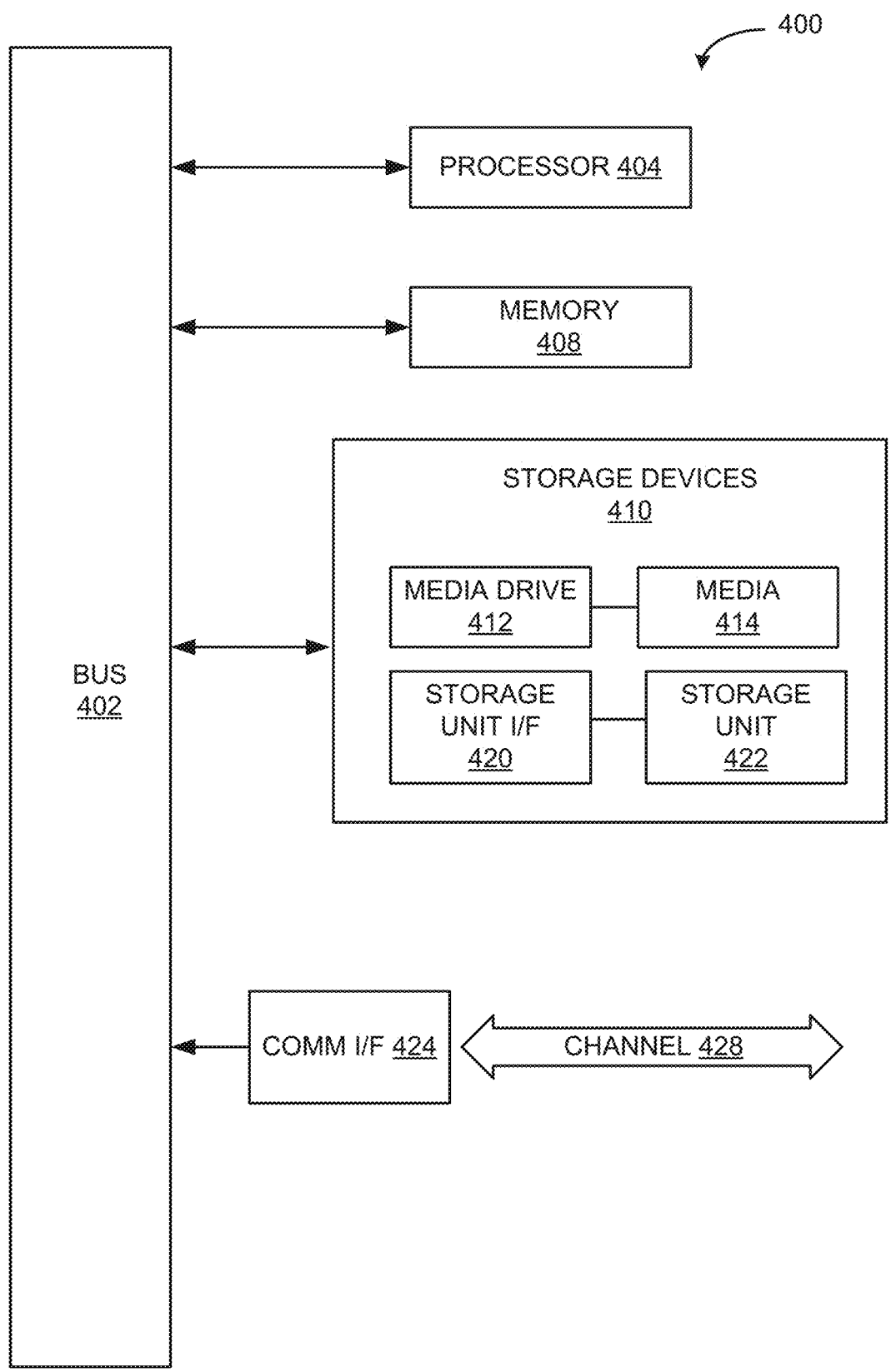
FIG. 4 is an example computing component that may be used to implement various features of embodiments described in the present disclosure.

FIG. 4 illustrates an example computing component that may be used to implement various features of the system and methods disclosed herein, for example, one or more elements of system 200, such as simulation device 202, and presentation (output) device 222.

As used herein, the term component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. In implementation, the various components described herein might be implemented as discrete components or the functions and features described can be shared in part or in total among one or more components. In other words, as would be apparent to one of ordinary skill in the art after reading this description, the various features and functionality described herein may be implemented in any given application and can be implemented in one or more separate or shared components in various combinations and permutations. Even though various features or elements of functionality may be individually described or claimed as separate components, one of ordinary skill in the art will understand that these features and functionality can be shared among one or more common software and hardware elements, and such description shall not require or imply that separate hardware or software components are used to implement such features or functionality.

Where components of the application are implemented in whole or in part using software, in one embodiment, these software elements can be implemented to operate with a computing or processing component capable of carrying out the functionality described with respect thereto. One such example computing component is shown in FIG. 4. Various embodiments are described in terms of this example-computing component 400. After reading this description, it will become apparent to a person skilled in the relevant art how to implement the application using other computing components or architectures.

Referring now to FIG. 4, computing component 400 may represent, for example, computing or processing capabilities found within a self-adjusting display, desktop, laptop, notebook, and tablet computers; hand-held computing devices (tablets, PDA's, smart phones, cell phones, palmtops, etc.); workstations or other devices with displays; servers; or any other type of special-purpose or general-purpose computing devices as may be desirable or appropriate for a given application or environment. Computing component 400 might also represent computing capabilities embedded within or otherwise available to a given device. For example, a computing component might be found in other electronic devices such as, for example navigation systems, portable computing devices, and other electronic devices that might include some form of processing capability.

Computing component 400 might include, for example, one or more processors, controllers, control components, or other processing devices, such as a processor 404. Processor 404 might be implemented using a general-purpose or special-purpose processing engine such as, for example, a microprocessor, controller, or other control logic. In the illustrated example, processor 404 is connected to a bus 402, although any communication medium can be used to facilitate interaction with other components of computing component 400 or to communicate externally.

Computing component 400 might also include one or more memory components, simply referred to herein as main memory 408. For example, preferably random access memory (RAM) or other dynamic memory, might be used for storing information and instructions to be executed by processor 404. Main memory 408 might also be used for storing temporary variables or other intermediate information during execution of instructions to be executed by processor 404. Computing component 400 might likewise include a read only memory ("ROM") or other static storage device coupled to bus 402 for storing static information and instructions for processor 404.

The computing component 400 might also include one or more various forms of information storage mechanism 410, which might include, for example, a media drive 412 and a storage unit interface 420. The media drive 412 might include a drive or other mechanism to support fixed or removable storage media 414. For example, a hard disk drive, a solid state drive, a magnetic tape drive, an optical disk drive, a compact disc (CD) or digital video disc (DVD) drive (R or RW), or other removable or fixed media drive might be provided. Accordingly, storage media 414 might include, for example, a hard disk, an integrated circuit assembly, magnetic tape, cartridge, optical disk, a CD or DVD, or other fixed or removable medium that is read by, written to or accessed by media drive 412. As these examples illustrate, the storage media 414 can include a computer usable storage medium having stored therein computer software or data.

In alternative embodiments, information storage mechanism 410 might include other similar instrumentalities for allowing computer programs or other instructions or data to be loaded into computing component 400. Such instrumentalities might include, for example, a fixed or removable storage unit 422 and an interface 420. Examples of such storage units 422 and interfaces 420 can include a program cartridge and cartridge interface, a removable memory (for example, a flash memory or other removable memory component) and memory slot, a PCMCIA slot and card, and other fixed or removable storage units 422 and interfaces 420 that allow software and data to be transferred from the storage unit 422 to computing component 400.

Computing component 400 might also include a communications interface 424. Communications interface 424 might be used to allow software and data to be transferred between computing component 400 and external devices. Examples of communications interface 424 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 424 might typically be carried on signals, which can be electronic, electromagnetic (which includes optical) or other signals capable of being exchanged by a given communications interface 424. These signals might be provided to communications interface 424 via a channel 428. This channel 428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media such as, for example, memory 408, storage unit 420, media 414, and channel 428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 400 to perform features or functions of the present application as discussed herein.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the components or functionality described or claimed as part of the component are all configured in a common package. Indeed, any or all of the various components of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A computer-implemented method, comprising:
receiving navigation information for a user trip from a starting location to a destination location, wherein the starting location and the destination location comprise real-world locations;
identifying a simulated audio-visual (A/V) story-telling experience based on the navigation information; and
presenting the simulated A/V story-telling experience to a user,
wherein the simulated A/V story-telling experience comprises a virtual character guide of a story configured to transition from a first virtual character associated with the starting location to a second virtual character, different than the first virtual character and associated with the destination location.

2. The computer-implemented method of claim 1, wherein the simulated A/V story-telling experience comprises physical navigation guidance from the starting location to the destination location.

3. The computer-implemented method of claim 1, wherein the simulated A/V story-telling experience is identified based on both the starting location and the destination location.

4. An apparatus, comprising:
a simulation device configured to create a simulated audio-visual (A/V) story-telling experience to provide physical navigation guidance for a user from a starting location to a destination location, wherein the starting location and the destination location comprise real-world locations;
at least one sensor configured to at least one of receive or provide user location information associated with the user moving from the starting location to the destination location; and
a presentation device configured to present the simulated A/V story-telling experience, wherein the simulated A/V story-telling experience is synchronized with the user location information;
wherein the simulated A/V story-telling experience comprises a virtual character guide of a story configured to transition from a first virtual character associated with the starting location to a second virtual character, different than the first virtual character and associated with the destination location.

5. The computer-implemented method of claim 1, wherein the identifying the simulated A/V story-telling experience comprises determining whether to select a simulated A/V story-telling experience associated with the starting location or a simulated A/V story-telling experience associated with the destination location.

6. The computer-implemented method of claim 5, wherein the determining whether to select the simulated A/V story-telling experience associated with the starting location or the simulated A/V story-telling experience associated with the destination location is based on a user preference with regard to the starting location and the destination location.

7. The computer-implemented method of claim 1, wherein the simulated A/V story-telling experience comprises the virtual character guide providing physical navigation guidance from the starting location to the destination location.

8. The computer-implemented method of claim 7, wherein the virtual character guide transitions from the first virtual character to the second virtual character as the user progresses from the starting location to the destination location.

9. The computer-implemented method of claim 1, wherein at least a portion of the navigation information is received via a manual input from the user.

10. The computer-implemented method of claim 1, wherein at least a portion of the navigation information is received via an inference from contextual information.

11. The computer-implemented method of claim 10, wherein the contextual information comprises an electronic calendar entry comprising location information.

12. The computer-implemented method of claim 10, wherein the contextual information comprises past user location history.

13. The computer-implemented method of claim 1, wherein at least a portion of the navigation information is received via an auditory input from the user.

14. The apparatus of claim 4, wherein the virtual character guide transitions from the first virtual character to the second virtual character based on a progress of the user from the starting location to the destination location.

15. The apparatus of claim 4, wherein the simulation device creates the simulated A/V story-telling experience based on at least one of the starting location or the destination location.

16. The apparatus of claim 15, wherein the simulation device updates the simulated A/V story-telling experience based on changes to the user location information.

17. The apparatus of claim 15, wherein the simulation device creates the simulated A/V story-telling experience based on both the starting location and the destination location.

* * * * *